Patented June 14, 1932

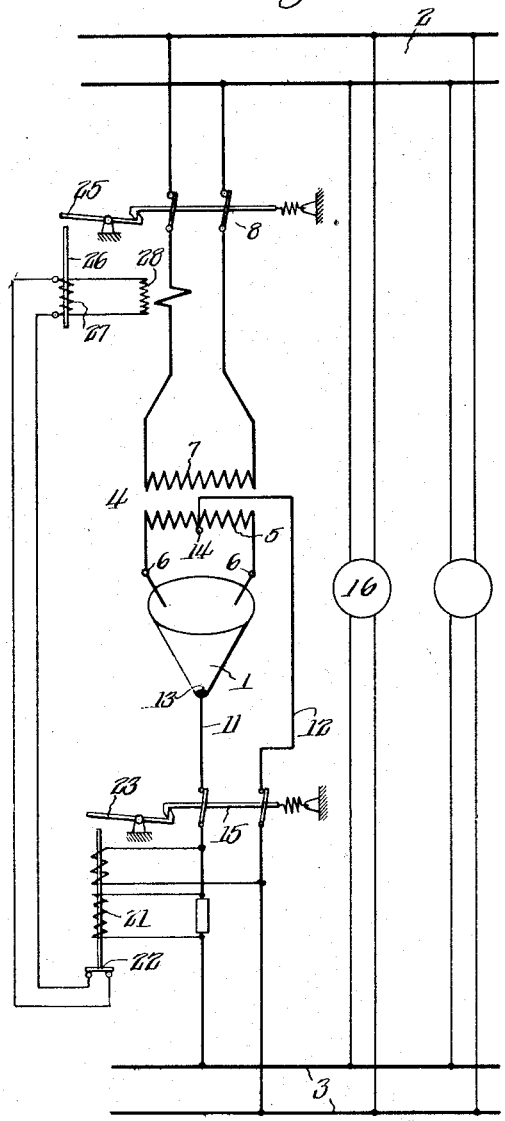

1,863,162

UNITED STATES PATENT OFFICE

ROBERT KELLER, OF ENNETBADEN, SWITZERLAND, ASSIGNOR TO AKTIENGESELLSCHAFT BROWN BOVERI & CIE., OF BADEN, SWITZERLAND, A JOINT STOCK COMPANY OF SWITZERLAND

RECTIFIER SYSTEM

Application filed July 2, 1927, Serial No. 203,091, and in Germany July 16, 1926.

This invention relates to rectifier systems, and has particular relation to automatic cut-out devices for disconnecting the rectifier in case of an internal short-circuit or failure of similar nature.

Among the objects of the invention is the provision of a rectifier system of the foregoing character wherein the rectifier is arranged to be disconnected from the direct current, as well as from the alternating current line, in response to an internal short-circuit. According to the invention this is effected by providing a reverse current relay in the direct current circuit of the rectifier and operating therefrom the cut-out mechanism of the circuit breakers disposed on the direct current side, as well as on the alternating current side of the rectifier.

The invention will be best understood from the following description of an exemplification thereof, reference being had to the accompanying drawing wherein Figure 1 illustrates diagrammatically a rectifier system embodying one form of the invention, and Fig. 2 illustrates another form.

One of the principal difficulties in the operation of large power rectifiers of the so-called mercury-arc type is the fact that internal backfire between the anodes of the rectifier constitutes a short-circuit not only for the alternating current line or the apparatus supplying the rectifier but also for parallel operating rectifiers or other apparatus supplying the direct current line. On occurrence of such internal short-circuits a relatively great amount of power, over and above that for which the rectifier is designed, will thus be fed into the same, causing serious damage thereto or destruction thereof. In order to safeguard the rectifier against such damage, circuit breakers have been provided in the connections between the rectifier and the associated power lines, the circuit breakers being of the high speed type so as to rapidly cut off the rectifier on occurrence of the fault.

According to my invention, a much higher degree of protection for systems of the foregoing character is obtained by causing the circuit breakers which control the alternating current connections of the rectifier as well as the circuit breakers which control the direct current connections thereof to be tripped by a common actuating relay or device responsive to the occurrence of a short-circuit or backfire in the interior of the rectifier. Such an arrangement is shown in Fig. 1 of the drawing wherein a two-phase mercury arc rectifier 1 is arranged to convert alternating current from a supply line 2 into direct current for supplying loads connected to a direct current line 3. The alternating current connection of the rectifier comprises a supply transformer 4 having a secondary winding 5 connected to the anodes 6 of the rectifier and a primary winding 7 which is connected through a high speed circuit breaker 8 to the alternating current line 2. The direct current connections of the rectifier comprise a pair of lines 11 and 12 leading from the cathode 13 of the rectifier and a mid-point 14 of the secondary winding 5 of the transformer, a high speed circuit breaker 15 interposed in said lines serving to disconnect the rectifier from the direct current power line 3.

The direct current power line 3 is supplied from a number of additional direct current supply apparatus indicated, such as 16.

In order to protect the rectifier and the entire system against damage incident to an internal short-circuit or backfire, a special protective arrangement is provided whereby a common actuating device responsive to the occurrence of an internal short-circuit or backfire causes the alternating current circuit breaker 8, as well as direct current breaker 15 to open, thereby disconnecting the rectifier from the alternating current power line 2, as well as from the direct current power line 3. In the arrangement shown in Fig. 1, I provide a reverse current or reverse power relay 21 in the direct current lead 11 of the rectifier. The reverse power relay 21 is normally in the position shown on the drawing, at which the contacts 22 are closed. The latch 23 operates normally to hold the high speed circuit breaker 15 in closed position as shown. The relay will remain in this position as long as the direct current is flowing from the rectifier 1 toward the direct current line 3. In the event of a reversal of the current occurring when a short-circuit takes place in the interior of the rectifier, the backward flow of current will cause relay 21 to lift the associated armature opening the contacts 22 and tripping the latch 23, thereby releasing the direct current breaker 15 so as to disconnect the rectifier lines 11 and 12 from the direct current power line 3. The back flow of direct current into the rectifier is thus cut off and the rectifier is thus protected against danger therefrom.

In addition to tripping the direct current circuit breaker 15, the reverse current relay 21 serves also to trip the alternating current circuit breaker 8. To this end the last-named circuit breaker is provided with a latch 25 which holds the same in closed position. The latch 25 may be tripped by armature 26 which is actuated by an operated coil 27 energized from a current transformer 28 associated with one of the leads between the main transformer 4 and the alternating current supply line 2. The end terminals of the operating coil 27 are connected to the contact members 22 on the reverse current relay 21 so that normally the operating coil 27 is short-circuited preventing the armature 26 from being picked up or raised to a position where the latch 25 is tripped. However, on occurrence of an internal short-circuit in the rectifier the reverse current relay 21, simultaneously with the tripping of the latch 23, which releases the direct current circuit breaker, also opens contacts 22. As a result, the armature 26 will be picked up and trip the latch mechanism 25 of the alternating current circuit breaker 8, causing the latter to open.

A somewhat different protective arrangement is shown in Fig. 2 in connection with the rectifier 31 constituting a power supply source for the direct current line 3 in parallel with the direct current rectifier 1 described hereinbefore. In this arrangement a reverse power relay 32 is provided in the direct current leads from the rectifier and an overload relay 33 is provided in the alternating current leads to the rectifier. The alternating current circuit breaker 8 and direct current circuit breaker 9 are each provided with similar tripping mechanisms 34 and 35 having actuating coils 36 and 37 arranged to be energized from an auxiliary supply source 38 when either relay 32 or 33 responds to an abnormal condition such as might cause damage to the rectifier if allowed to continue for an appreciable period of time. For instance, if a reverse power flow should occur from the direct current line 3 in case of an internal short-circuit in the rectifier, the direct current relay 32 will pick up, closing its contacts and thereby establishing an energizing circuit for actuating coils 36 and 37. This causes both circuit breakers 8 and 9 to open and disconnect the rectifier. Similarly, in case an excessive current flow should take place from the alternating current line 2 into the rectifier, the overload relay 33 will pick up, energizing the actuating coils 36 and 37 to trip the two circuit breakers and disconnect the rectifier from both lines. A high degree of protection is thus assured.

The invention is not limited to the particular arrangements described and shown hereinabove, but is susceptible of many modifications that will suggest themselves to those skilled in the art. The various relays and circuit-breaker mechanisms shown in the drawing are intended to be only diagrammatic representations of the devices that are to be used, and any of the familiar apparatus of this type may be employed for securing the cooperative effect of the various elements explained hereinabove. It is accordingly desired that the appended claims be construed broadly commensurate with the scope of the invention within the art.

I claim:

1. In a rectifier system, an alternating-current supply line, a direct-current power line, a rectifier interconnecting said lines, an alternating-current circuit-breaker for disconnecting said rectifier from said alternating-current line, a direct-current circuit-breaker for disconnecting said rectifier from the direct-current line, and a relay common with respect to said circuit-breakers and operable in response to pre-determined operating conditions of said rectifier to effect opening operation of said circuit-breakers.

2. In a rectifier system, an alternating-current supply-line, a direct-current power line, a rectifier interconnecting said lines, an alternating-current circuit-breaker for disconnecting said rectifier from said alternating-current line, a direct-current circuit-breaker for disconnecting said rectifier from the direct-current line, and means responsive to a reverse power flow from the direct-current line into said rectifier for causing actuation of both of said circuit-breakers to disconnect the rectifier from both of said lines.

3. In a rectifier system, an alternating-current power line, a direct-current power-line, a rectifier for transforming current from said alternating current line into current for said direct-current line, an alternating-current circuit-breaker for disconnecting said rectifier from said alternating-current line, a direct-current circuit-breaker for disconnecting said rectifier from said direct-current line, a reverse-power relay device for causing opening of said direct-current circuit-breaker in response to reverse current flow into said rectifier, said device controlling the operation of said alternating-current circuit-breaker.

4. In a mercury-arc rectifier system, an alternating-current power line for supplying said rectifier, a direct-current line supplied by said rectifier, an alternating-current circuit-breaker for disconnecting said rectifier from said alternating-current line, a direct-current circuit-breaker for disconnecting said direct-current line from said rectifier, a reverse-current relay associated with the connection of said rectifier to said direct-current line, said relay actuating said direct-current circuit-breaker to open in response to direct-current flow from said direct-current line into said rectifier, a tripping coil for opening said alternating-current circuit-breaker, said tripping coil being energized from said alternating-circuit line, and means for controlling the energization of said tripping coil in response to the operation of said relay.

5. In combination, a rectifier, an alternating-current line for supplying said rectifier, a circuit-breaker for disconnecting said rectifier from said line, a direct-current power line supplied by said rectifier, a circuit-breaker for disconnecting said direct-current line from said rectifier, tripping means for causing opening of said direct-current circuit-breaker in response to abnormal conditions in said rectifier, a tripping coil for opening said alternating-current circuit-breaker, said tripping coil being energized from said alternating-current supply, said energization being controlled by the tripping means for said direct-current circuit-breaker.

6. In combination a mercury arc rectifier, an alternating current supply line, an alternating-current circuit-breaker for connecting said rectifier to said line to be supplied therefrom, a direct-current power line, a direct-current circuit-breaker for connecting said direct-current power line to said rectifier to be supplied therefrom, a reverse-current relay device in the connection between said rectifier and said direct-current line, said relay device causing opening of said direct-current circuit-breaker in response to reverse current flow into said rectifier, a tripping coil for opening said alternating-current circuit-breaker, a current transformer associated with the alternating-current supply to said rectifier for energizing said tripping coil, said relay being arranged to short-circuit said tripping coil under normal current flow conditions from said rectifier to said direct-current line, actuation of said reverse-current relay in response to reverse current flow opening said short-circuit.

7. In a current-rectifying system, metal-vapor rectifying apparatus having a cathode and a plurality of anodes, transformer means providing a current supply for said apparatus and comprising a secondary winding connected to said anodes and a primary winding, an alternating-current line, a direct-current line, switch means operable to provide an operating connection between said cathode and said direct-current line, second switch means operable to provide an operating connection between said primary winding and said alternating-current line, and means common with respect to said first and second-named switch means and responsive to conditions of current flow in said first-named operating connection toward said cathode and operable upon occurrence of such conditions to effect opening operaation of said first and second-named switch means, said common means being non-effective with respect to said first and second-named switch means during conditions of current flow in said first-named operating connection from said cathode to said direct-current line.

In testimony whereof I have hereunto subscribed my name this 15th day of June, A. D. 1927, at Zurich, Switzerland.

ROBERT KELLER.

CERTIFICATE OF CORRECTION.

Patent No. 1,863,162.  June 14, 1932.

ROBERT KELLER.

It is hereby certified that error appears in the printed specification of the above numbered patent requiring correction as follows: Page 2, line 117, claim 3, for "alternating current" read "alternating-current"; page 3, line 14, claim 4, for "alternating-circuit" read "alternating-current"; and line 74, claim 7, for the misspelled word "operaation" read "operation"; and that the said Letters Patent should be read with these corrections therein that the same may conform to the record of the case in the Patent Office.

Signed and sealed this 10th day of January, A. D. 1933.

(Seal)

M. J. Moore,
Acting Commissioner of Patents.